United States Patent Office 3,522,176
Patented July 28, 1970

3,522,176
PLASTIC ANTIFRICTION MATERIAL
Vasily Vladimirovich Korshak, Ul. Gubkina 4, kv. 81;
Irina Alexandrovna Gribova, Ul. Vavilova 10, korp.
20, kv. 31; Igor Viktorovich Kragelsky, Frunzenskaya
nab. 48, kv. 6; Grigory Lvovich Slonimsky, Ul. Chka-
lova 1/4, kv. 16; Alexandr Petrovich Krasnov, Prospekt
Kalinina 31, kv. 28; Alla Nikolaevna Chumaevskaya,
Leninsky prospekt 101, korp. 163, kv. 86; Vera Ed-
mondovna Vainshtein, Ul. Dmitria Ulianova 4/34, korp.
B, kv. 185; Galina Iosifovna Troyanovskaya, 11 Parko-
vaya ul. 44/3, kv. 8; Vladimir Alexandrovich Sergeev,
Novye Cheremushki, kvartal 21b, korpus 10, kv. 26;
Anri Alexandrovich Askadsky, Jugo-Zapadny kvartal
46–47, korp. 39, kv. 25; and Valentin Kuzmich Shitikov,
LoMonosovsky prospekt 18, kv. 99, all of Moscow,
U.S.S.R.; and Olga Anatolievna Suchkova, Volsky raion,
pos. Shikhany-2,439, kv. 16, Saratovskaya obl., U.S.S.R.
No Drawing. Filed Sept. 21, 1967, Ser. No. 669,402
Int. Cl. C10m 7/28, 7/16, 7/06
U.S. Cl. 252—12           8 Claims

ABSTRACT OF THE DISCLOSURE

An antifriction plastic material consisting of phenol-
phthalein - phenol - formaldehyde resin and powdered
molybdenum disulfide and metal powders as fillers.

This invention relates to plastic antifriction materials.

The present antifriction material, in the form of com-
pression molded elements, is intended for use in dry
friction assemblies.

There are known in the art antifriction materials based
on phenol-formaldehyde resins and fillers, such as graph-
ite and molybdenum disulfide powders, etc. (Swiss Pat.
No. 352,440, 1961).

The known antifriction materials are noted for the
disadvantage of having low wear resistance which prop-
erty precludes the employment of elements made from
these materials in sliding friction assemblies.

In addition, said antifriction materials, due to poor
workability, do not lend themselves to fabrication into
intricately shaped elements used in rolling friction as-
semblies.

It is an object of the present invention to provide an
antifriction material having a low coefficient of friction,
high wear resistance, and good workability, so that the
material will lend itself to fabrication into intricately
shaped elements.

This and other objects are accomplished, according
to the invention, by an antifriction material which com-
prises phenolphthalein-phenol-formaldehyde resin as a
polymer component.

It is advantageous to employ an antifriction material
containing 10–20% by weight of phenolphthalein-phenol-
formaldehyde resin.

Improved workability of the present antifriction ma-
terial required for the fabrication of intricately shaped
elements is attained by incorporating a fluorinated plas-
tic powder into the filler.

It is preferable to employ an antifriction material con-
taining not more than 2% by weight of said fluorinated
plastic powder.

The present antifriction material is prepared in the
following manner.

The components of the antifriction material, i.e.,
phenolphthalein-phenol-formaldehyde resin and molyb-
denum disulfide powder (filler) of adequate fineness are
subjected to mixing until the mixture is completely
homogeneous, followed by molding the mixture thus
obtained.

The filler may likewise contain powdered fluorinated
plastic. In this case, the molybdenum disulfide and flu-
orinated plastic are premixed in a vibrating mill, and to
the mixture there is added phenolphthalein-phenol-
formaldehyde resin. The procedure employed to prepare
the antifriction composition is as disclosed hereinabove.

The content of fluorinated plastic in the antifriction
material should not exceed 2% by weight.

Metal powders may also be employed as filler ingre-
dients for the purpose of improving heat and electrical
conductivity, enhancing moldability, increasing hard-
ness characteristics, and increasing the wear resistance
of the antifriction material.

The procedure employed to prepare the antifriction
composition containing metal powder is analogous to
that described hereinabove.

For a better understanding of the invention, the fol-
lowing examples of preparing the present antifriction
material are given by way of illustration only.

EXAMPLE 1

Into a vibrating mill were charged 36 g. of phenol-
phthalein-phenol-formaldehyde resin, 189 g. of molyb-
denum disulfide powder (particle size, 1 to 15 microns),
and 75 g. of powdered copper metal. Mixing time, 1.5
minutes.

The mixture thus obtained was subjected to compres-
sion molding at a temperature of 180–250° C. and a
specific pressure of 1,000 kg./cm.$^2$.

EXAMPLE 2

Into a vibrating mill were charged 36 g. of phenol-
phthalein-phenol-formaldehyde resin, 189 g. of molybde-
num disulfide powder (particle size, 1 to 15 microns), and
75 g. of powdered nickel metal.

Mixing and molding conditions were as disclosed in
Example 1.

EXAMPLE 3

Into a vibrating mill were charged 36 g. of phenol-
phthalein-phenol-formaldehyde resin, 189 g. of molybde-
num disulfide powder (particle size, 1 to 15 microns), and
75 g. of powdered molybdenum metal.

Mixing and molding conditions were as disclosed in
Example 1.

EXAMPLE 4

Into a vibrating mill were charged 300 g. of molybde-
num disulfide, and 9 g. of polytetrafluoroethylene. The
contents of the mill were subjected to mixing for 25
minutes to attain complete homogeneity.

180 g. of the above mixture, 48 g. of phenolphthalein-
phenol-formaldehyde resin, and 72 g. of powdered copper
metal were charged into the vibrating mill.

Mixing and molding conditions were as disclosed in
Example 1.

EXAMPLE 5

Into a vibrating mill were charged 300 g. of molybde-
num disulfide and 9 g. of polytetrafluoroethylene. The
contents of the mill were subjected to mixing for 25
minutes to attain complete homogeneity.

180 g. of the above mixture, 48 g. of phenolphthalein-
phenol-formaldehyde resin, and 72 g. of powdered silver
metal were charged into the vibrating mill.

Mixing and molding conditions were as disclosed in
Example 1.

EXAMPLE 6

Into a vibrating mill were charged 300 g. of molybde-
num disulfide and 9 g. of polytetrafluoroethylene. The
contents of the mill were subjected to mixing for 25
minutes until complete homogeneity is attained.

180 g. of the above mixture, 48 g. of phenolphthalein-phenol-formaldehyde resin, and 72 g. of powdered copper metal were charged into the vibrating mill.

Mixing and molding conditions were as disclosed in Example 1.

The present antifriction material is noted for its good wear resistance, low coefficient of friction and adequate workability. The physical and mechanical characteristics of the material are as follows:

Brinell hardness—28–31 kg./mm.$^2$
Compression strength—900–1,500 kg./cm.$^3$
Coefficient of friction—0.05–0.08
Linear wear rate —$1 \times 10^{-9}$ Although the present invention has been described with reference to a preferred embodiment thereof, it will be readily understood by those skilled in the art that various changes and modifications may be resorted to without deviating from the spirit and scope of the invention.

Such changes and modifications are to be considered as falling within the spirit and scope of the invention as disclosed in the description and appended claims.

We claim:

1. A plastic antifriction material consisting of phenolphthalein-phenol-formaldehyde resin and fillers consisting of molybdenum disulfide and metal powders.

2. A plastic antifriction material according to claim 1, and constituted of 10–20 weight percent of phenolphthalein-phenol-formaldehyde resin, 40–70 weight percent of powdered molybdenum disulfide, and 20–40 weight percent of a metal powder.

3. A plastic antifriction material consisting of phenolphthalein-phenol-formaldehyde resin and fillers consisting of powdered molybdenum disulfide, metal powders and powdered polytetrafluoroethylene.

4. A plastic antifriction material according to claim 3, and constituted of 10–20 weight percent of phenolphthalein-phenol-formaldehyde resin, 70–40 weight percent of powdered molybdenum disulfide, 18–38 weight percent of a metal powder and 2 weight percent of powdered polytetrafluoroethylene.

5. A plastic antifriction material according to claim 1 wherein the metal powder is powdered copper, silver, molybdenum, or nickel metal.

6. A plastic antifriction material according to claim 3 wherein the metal powder is powdered copper, silver, molybdenum, or nickel metal.

7. A plastic antifriction material according to claim 2 wherein the metal powder is powdered copper, silver, molybdenum, or nickel metal.

8. A plastic antifriction material according to claim 4 wherein the metal powder is powdered copper, silver, molybdenum, or nickel metal.

References Cited

UNITED STATES PATENTS

| | | | |
|---|---|---|---|
| 2,956,848 | 10/1960 | St. Clair | 252—12 |
| 3,014,865 | 12/1961 | Seniff et al. | 252—12 |

DANIEL E. WYMAN, Primary Examiner

I. VAUGHN, Assistant Examiner